US011112524B2

(12) United States Patent
Fouda et al.

(10) Patent No.: US 11,112,524 B2
(45) Date of Patent: Sep. 7, 2021

(54) METHOD FOR ESTIMATING THE MATERIAL PROPERTIES AND THE INDIVIDUAL THICKNESSES OF NESTED PIPES

(71) Applicant: Halliburton Energy Services, Inc., Houston, TX (US)

(72) Inventors: Ahmed Elsayed Fouda, Spring, TX (US); Kai Ren, Madison, WI (US); Ilker R. Capoglu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/475,424

(22) PCT Filed: Oct. 26, 2018

(86) PCT No.: PCT/US2018/057802
§ 371 (c)(1),
(2) Date: Jul. 2, 2019

(87) PCT Pub. No.: WO2019/094209
PCT Pub. Date: May 16, 2019

(65) Prior Publication Data
US 2020/0271818 A1 Aug. 27, 2020

Related U.S. Application Data

(60) Provisional application No. 62/582,801, filed on Nov. 7, 2017.

(51) Int. Cl.
*G01V 3/28* (2006.01)
*E21B 47/00* (2012.01)

(52) U.S. Cl.
CPC ............... *G01V 3/28* (2013.01); *E21B 47/00* (2013.01)

(58) Field of Classification Search
CPC ... G01V 3/28; G01V 3/26; G01V 3/34; G01V 1/40; E21B 47/00; E21B 47/08;
(Continued)

(56) References Cited

U.S. PATENT DOCUMENTS 5,101,559 A * 4/1992 Gelpi .................... B21D 39/04
29/402.18
7,960,969 B2 6/2011 Mouget et al.
(Continued)

FOREIGN PATENT DOCUMENTS

EP 1795920 6/2007
EP 2792843 10/2014
(Continued)

OTHER PUBLICATIONS

ISRWO International Search Report and Written Opinion for PCT/US2018/057802 dated Feb. 8, 2019.
(Continued)

*Primary Examiner* — Christopher P McAndrew
*Assistant Examiner* — Zannatul Ferdous
(74) *Attorney, Agent, or Firm* — John Wustenberg; C. Tumey Law Group PLLC (57) ABSTRACT

A method and system for determining properties of a pipe string using multi-channel induction measurements. The method may comprise disposing a multi-channel induction tool in a cased hole, obtaining a multi-channel measurement, forming a log from the multi-channel measurement, extracting at least one abnormality that corresponds to known metal thickness, performing a search to find a set of pipe material properties that minimize a mismatch between the abnormality and a simulated response, and inverting the log to estimate the set of pipe material properties at one or more depth points using the set of pipe material properties. The system may comprise a multi-channel induction tool. The
(Continued)

multi-channel induction tool may comprise at least one transmitter, at least one receiver, and an information handling system.

20 Claims, 6 Drawing Sheets (58) Field of Classification Search
CPC ......... E21B 47/082; E21B 41/02; G01B 7/10; G01B 15/02; G01B 7/06; G01N 27/90; G01L 315/02
See application file for complete search history.

(56) References Cited

U.S. PATENT DOCUMENTS

| | | | |
|---|---|---|---|
| 9,715,034 B2 | 7/2017 | Omeragic et al. | |
| 2005/0021701 A1* | 1/2005 | Seki | G06F 11/3604 709/223 |
| 2006/0095239 A1* | 5/2006 | Frenkel | G01V 1/40 703/5 |
| 2015/0338541 A1 | 11/2015 | Nichols et al. | |
| 2016/0168975 A1* | 6/2016 | Donderici | G01B 7/10 324/238 |
| 2017/0176629 A1* | 6/2017 | Omeragic | G01V 3/28 |
| 2019/0162870 A1* | 5/2019 | San Martin | G01V 3/26 |

FOREIGN PATENT DOCUMENTS

| | | |
|---|---|---|
| WO | 2011000500 | 1/2011 |
| WO | 2015157270 | 10/2015 |
| WO | 2016007282 | 1/2016 |
| WO | 2016010915 | 1/2016 |
| WO | 2017048263 | 3/2017 |
| WO | 2017151123 | 9/2017 |
| WO | 2017196357 | 11/2017 |
| WO | 2018031047 | 2/2018 |
| WO | 2019032262 | 2/2019 |
| WO | 2019094225 | 5/2019 |

OTHER PUBLICATIONS

D. Abdallah, M. Fahim, K. Al-Hendi, M. Al-Muhailan, et al., Casing Corrosion Measurement to Extend Asset Life, 2013.
Extended European Search Report and Written Opinion for Application No. 18875594 dated Dec. 7, 2020.

* cited by examiner

METHOD FOR ESTIMATING THE MATERIAL PROPERTIES AND THE INDIVIDUAL THICKNESSES OF NESTED PIPES

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

Corrosion of metal pipes is an ongoing issue. Efforts to mitigate corrosion include use of corrosion-resistant alloys, coatings, treatments, and corrosion transfer, among others. Also, efforts to improve corrosion monitoring are ongoing. For downhole casing strings, various types of corrosion monitoring tools are available. One type of corrosion monitoring tool uses electromagnetic (EM) fields to estimate pipe thickness or other corrosion indicators. As an example, a multi-channel induction tool may collect data on pipe thickness to produce an EM log. The EM log data may be interpreted to determine the condition of production and inter mediate casing strings, tubing, collars, filters, packers, and perforations through different channels transmitted by the multi-channel induction tool. Log data may be utilized for estimating material properties and individual thicknesses of nested pipes using multi-frequency multi-spacing induction measurements. By analyzing the signal levels at these different channels through inversion, it may be possible to relate a certain received signal to a certain metal loss or gain at each pipe. In order to get accurate estimate of the metal loss and/or gain, other pipe properties such as the magnetic permeability and the electrical conductivity may also be estimated. Accurately estimating the magnetic permeability $\mu$ and the electrical conductivity $\sigma$ may be beneficial in determining metal loss and/or gain in pipes.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to methods for estimating the magnetic permeability $\mu$ and the electrical conductivity $\sigma$ through searching for the optimum combination of $\mu$ and $\sigma$ that minimizes the mismatch between a measured signature of a feature of known metal thickness and a corresponding synthetic signature obtained from running a forward model. After the material properties of the pipes have been estimated, individual thicknesses are estimated through model-based inversion. Other processing steps in the workflow may ensure high-quality inversion with minimal processing time.

During operations, electromagnetic (EM) sensing may provide continuous in situ measurements of parameters related to the integrity of pipes in cased boreholes. As a result, EM sensing may be used in cased borehole monitoring applications. Multi-channel induction tools (which may also be referred to as an EM logging tool) may be configured for multiple concentric pipes (e.g., for one or more) with the first pipe diameter varying (e.g., from about two inches to about seven inches or more). Multi-channel induction tools may measure eddy currents to determine metal loss and use magnetic cores at the transmitters. The multi-channel induction tools may use pulse eddy current (time-domain) and may employ multiple (long, short, and transversal) coils to evaluate multiple types of defects in double pipes. It should be noted that the techniques utilized in time-domain may be utilized in frequency-domain measurements. The multi-channel induction tools may operate on a conveyance. Multi-channel induction tools may include an independent power supply and may store the acquired data on memory. A magnetic core may be used in defect detection in multiple concentric pipes.

Monitoring the condition of the production and intermediate casing strings is crucial in oil and gas field operations. EM eddy current (EC) techniques have been successfully used in inspection of these components. EM EC techniques consist of two broad categories: frequency-domain EC techniques and time-domain EC techniques. In both techniques, one or more transmitters are excited with an excitation signal, and the signals from the pipes are received and recorded for interpretation. The received signal is typically proportional to the amount of metal that is around the transmitter and the receiver. For example, less signal magnitude is typically an indication of more metal, and more signal magnitude is an indication of less metal. This relationship may allow for measurements of metal loss, which typically is due to an anomaly related to the pipe such as corrosion or buckling.

In case of multiple nested pipe strings, the received signal may be a non-linear combination of signals from all pipes. As a result, it is not possible, in general, to use a simple linear relationship to relate the signal received to metal loss or gain for pipe strings composed of three or more nested pipes. In order to address this problem, a method called "inversion" is used. Inversion makes use of a forward model and compares it to the signal to determine the thickness of each pipe. The forward model is executed repeatedly until a satisfactory match between the modeled signal and measured signal is obtained. The forward model typically needs to be run hundreds of times or more for each logging point. As a result, it needs to be a computationally efficient model. In order to achieve the computational efficiency, certain simplifications of the real problem need to be considered for the forward model. One of the most significant simplifications is the centralization assumption, where each pipe is assumed to be perfectly centered with respect to other pipes as well as the measurement instrument. Making such an assumption significantly improves the forward modeling computational efficiency and allows a feasible EM multi-pipe inspection solution. However, it also results in artifacts at depths where such assumption is invalidated, i.e. where eccentricity effects exist. The ideas that are disclosed below facilitate identification and removal of such artifacts.

Figure 1:
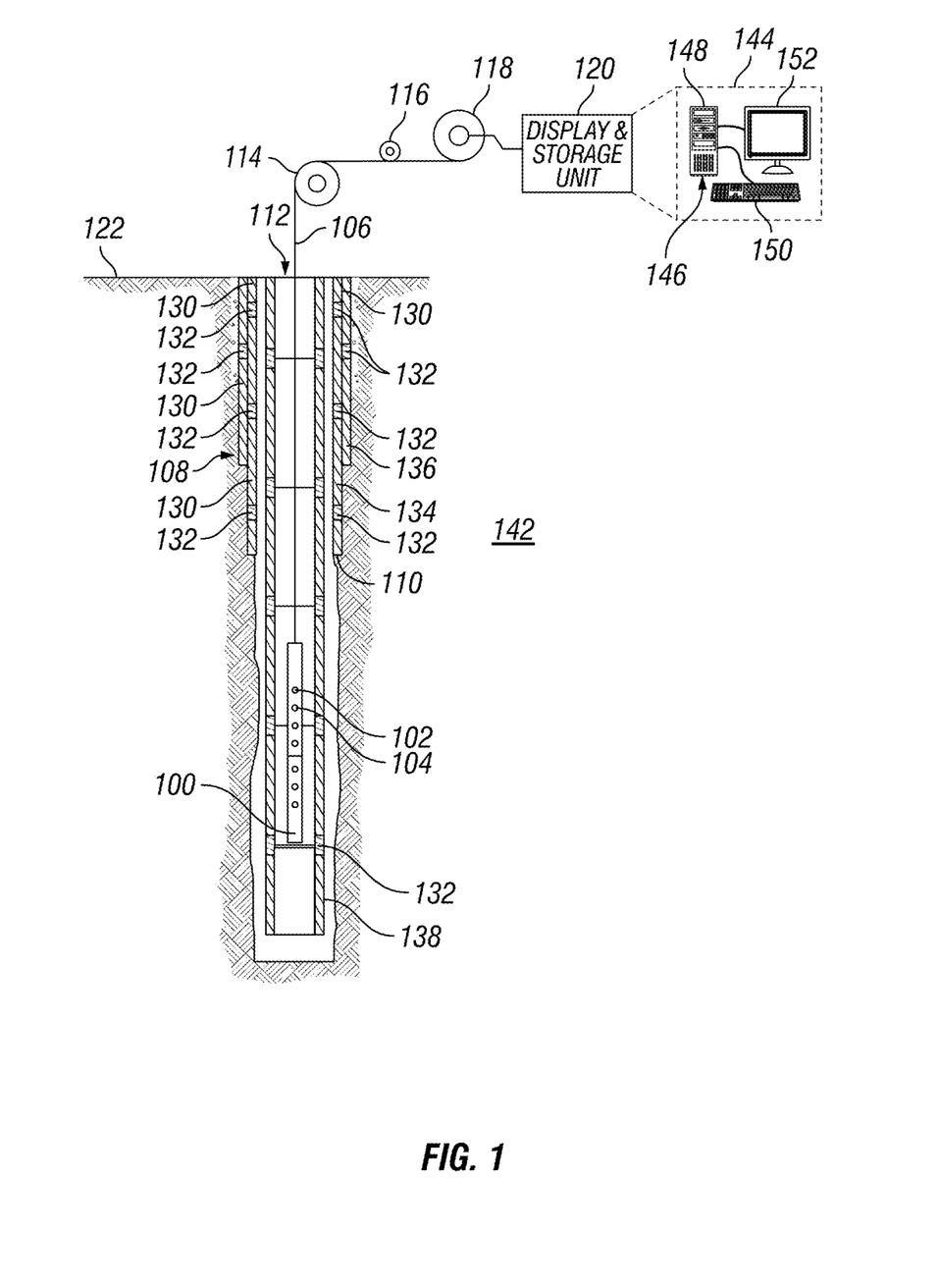
FIG. 1 illustrates an example of a multi-channel induction tool disposed in a wellbore.

FIG. 1 illustrates an operating environment for a multi-channel induction tool 100 as disclosed herein. Multi-channel induction tool 100 may comprise a transmitter 102 and/or a receiver 104. In examples, multi-channel induction tool 100 may be an induction tool that may operate with continuous wave execution of at least one frequency. This may be performed with any number of transmitters 102 and/or any number of receivers 104, which may be disposed on multi-channel induction tool 100. In additional examples, transmitter 102 may function and/or operate as a receiver 104. Multi-channel induction tool 100 may be operatively coupled to a conveyance 106 (e.g., wireline, slickline, coiled tubing, pipe, downhole tractor, and/or the like) which may provide mechanical suspension, as well as electrical connectivity, for multi-channel induction tool 100. Conveyance 106 and multi-channel induction tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by multi-channel induction tool 100 may be stored on memory and then processed by display and storage unit 120 after recovery of multi-channel induction tool 100 from wellbore 110. Alternatively, signals recorded by multi-channel induction tool 100 may be conducted to display and storage unit 120 by way of conveyance 106. Display and storage unit 120 may process the signals, and the information contained therein may be displayed for an operator to observe and stored for future processing and reference. In examples, an operator may be defined as an individual, group of individuals, or an organization. Alternatively, signals may be processed downhole prior to receipt by display and storage unit 120 or both downhole and at surface 122, for example, by display and storage unit 120. Display and storage unit 120 may also contain an apparatus for supplying control signals and power to multi-channel induction tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. Multi-channel induction tool 100 may be dimensioned so that it may be lowered into the wellbore 110 through pipe string 138, thus avoiding the difficulty and expense associated with pulling pipe string 138 out of wellbore 110.

In logging systems, such as, for example, logging systems utilizing the multi-channel induction tool 100, a digital telemetry system may be employed, wherein an electrical circuit may be used to both supply power to multi-channel induction tool 100 and to transfer data between display and storage unit 120 and multi-channel induction tool 100. A DC voltage may be provided to multi-channel induction tool 100 by a power supply located above ground level, and data may be coupled to the DC power conductor by a baseband current pulse system. Alternatively, multi-channel induction tool 100 may be powered by batteries located within the downhole tool assembly, and/or the data provided by multi-channel induction tool 100 may be stored within the downhole tool assembly, rather than transmitted to the surface during logging (corrosion detection).

Multi-channel induction tool 100 may be used for excitation of transmitter 102. Transmitter 102 may transmit electromagnetic fields into subterranean formation 142. It should be noted that transmitter 102 may transmit across any number of channels and at any number of frequencies, which may produce any number of electromagnetic fields. The electromagnetic fields from transmitter 102 may be referred to as a primary electromagnetic field. The primary electromagnetic fields may produce Eddy currents in casing string 108 and pipe string 138. These Eddy currents, in turn, produce secondary electromagnetic fields that may be sensed along with the primary electromagnetic fields by receivers 104. Characterization of casing string 108 and pipe string 138, including determination of pipe attributes, may be performed by measuring and processing these electromagnetic fields. Pipe attributes may include, but are not limited to, pipe thickness, pipe conductivity, and/or pipe permeability.

As illustrated, receivers 104 may be positioned on the multi-channel induction tool 100 at selected distances (e.g., axial spacing) away from transmitters 102. The axial spacing of receivers 104 from transmitters 102 may vary, for example, from about 0 inches (0 cm) to about 40 inches (101.6 cm) or more. Without limitation, receivers 104 may record measurements across any number of channels and at any number of frequencies. It should be understood that the configuration of multi-channel induction tool 100 shown on FIG. 1 is merely illustrative and other configurations of multi-channel induction tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, multi-channel induction tool 100 may include more than one transmitter 102 and more or less than six of the receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may transmit, for example, a multi-frequency signal or a broadband signal. While not shown, multi-channel induction tool 100 may include a transmitter 102 and receiver 104 that are in the form of coils or solenoids coaxially positioned within a downhole tubular (e.g., casing string 108) and separated along the tool axis. Alternatively, multi-channel induction tool 100 may include a transmitter 102 and receiver 104 that are in the form of coils or solenoids coaxially positioned within a downhole tubular (e.g., casing string 108) and collocated along the tool axis.

Transmission of EM fields by the transmitter 102 and the recordation of signals by receivers 104 may be controlled by display and storage unit 120, which may include an information handling system 144. As illustrated, the information handling system 144 may be a component of the display and storage unit 120. Alternatively, the information handling system 144 may be a component of multi-channel induction tool 100. An information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with multi-channel induction tool 100 and/or software executed by processing unit 146. For example, information handling system 144 may enable an operator to select analysis options, view collected log data, view analysis results, and/or perform other tasks.

Multi-channel induction tool 100 may use any suitable EM technique based on Eddy current ("EC") for inspection of concentric pipes (e.g., casing string 108 and pipe string 138). EC techniques may be particularly suited for characterization of a multi-string arrangement in which concentric pipes are used. EC techniques may include, but are not limited to, frequency-domain EC techniques and time-domain EC techniques.

In frequency domain EC techniques, transmitter 102 of multi-channel induction tool 100 may be fed by a continuous sinusoidal signal, producing primary magnetic fields that illuminate the concentric pipes (e.g., casing string 108 and pipe string 138). The primary electromagnetic fields produce Eddy currents in the concentric pipes. These Eddy currents, in turn, produce secondary electromagnetic fields that may be sensed along with the primary electromagnetic fields by the receivers 104. Characterization of the concentric pipes may be performed by measuring and processing these electromagnetic fields.

In time domain EC techniques, which may also be referred to as pulsed EC ("PEC"), transmitter 102 may be fed by a pulse. Transient primary electromagnetic fields may be produced due the transition of the pulse from "off" to "on" state or from "on" to "off" state (more common). These transient electromagnetic fields produce EC in the concentric pipes (e.g., casing string 108 and pipe string 138). The EC, in turn, produce secondary electromagnetic fields that may be measured by receivers 104 placed at some distance on the multi-channel induction tool 100 from transmitter 102, as shown on FIG. 1. Alternatively, the secondary electromagnetic fields may be measured by a co-located receiver (not shown) or with transmitter 102 itself.

It should be understood that while casing string 108 is illustrated as a single casing string, there may be multiple layers of concentric pipes disposed in the section of wellbore 110 with casing string 108. EM log data may be obtained in two or more sections of wellbore 110 with multiple layers of concentric pipes. For example, multi-channel induction tool 100 may make a first measurement of pipe string 138 comprising any suitable number of joints 130 connected by collars 132. Measurements may be taken in the time-domain and/or frequency range. Multi-channel induction tool 100 may make a second measurement in a casing string 108 of first casing 134, wherein first casing 134 comprises any suitable number of pipes connected by collars 132. Measurements may be taken in the time-domain and/or frequency domain. These measurements may be repeated any number of times and for second casing 136 and/or any additional layers of casing string 108. In this disclosure, as discussed further below, methods may be utilized to determine the location of any number of collars 132 in casing string 108 and/or pipe string 138. Determining the location of collars 132 in the frequency domain and/or time domain may allow for accurate processing of recorded data in determining properties of casing string 108 and/or pipe string 138 such as corrosion. As mentioned above, measurements may be taken in the frequency domain and/or the time domain.

In frequency domain EC, the frequency of the excitation may be adjusted so that multiple reflections in the wall of the pipe (e.g., casing string 108 or pipe string 138) are insignificant, and the spacing between transmitters 102 and/or receiver 104 is large enough that the contribution to the mutual impedance from the dominant (but evanescent) waveguide mode is small compared to the contribution to the mutual impedance from the branch cut component. The remote-field eddy current (RFEC) effect may be observed. In a RFEC regime, the mutual impedance between the coil of transmitter 102 and coil of one of the receivers 104 may be sensitive to the thickness of the pipe wall. To be more specific, the phase of the impedance varies as:

$$\phi = 2\sqrt{\frac{\omega\mu\sigma}{2}}\,t \tag{1}$$

and the magnitude of the impedance shows the dependence:

$$\exp\left[-2\left(\sqrt{\frac{\omega\mu\sigma}{2}}\right)t\right] \tag{2}$$

where $\omega$ is the angular frequency of the excitation source, $\mu$ is the magnetic permeability of the pipe, $\sigma$ is the electrical conductivity of the pipe, and t is the thickness of the pipe. By using the common definition of skin depth for the metals as:

$$\delta = \sqrt{\frac{2}{\omega\mu\sigma}} \tag{3}$$

The phase of the impedance varies as:

$$\varphi \cong 2\frac{t}{\delta} \quad (4)$$

and the magnitude of the impedance shows the dependence:

$$\exp\left[\frac{-2t}{\delta}\right] \quad (5)$$

In RFEC, the estimated quantity may be the overall thickness of the metal. Thus, for multiple concentric pipes, the estimated parameter may be the overall or sum of the thicknesses of the pipes. The quasi-linear variation of the phase of mutual impedance with the overall metal thickness may be employed to perform fast estimation to estimate the overall thickness of multiple concentric pipes. For this purpose, for any given set of pipes dimensions, material properties, and tool configuration, such linear variation may be constructed quickly and may be used to estimate the overall thickness of concentric pipes. Information handling system 144 may enable an operator to select analysis options, view collected log data, view analysis results, and/or perform other tasks.

Monitoring the condition of pipe string 138 and casing string 108 may be performed on information handling system 144 in oil and gas field operations. Information handling system 144 may be utilized with Electromagnetic (EM) Eddy Current (EC) techniques to inspect pipe string 138 and casing string 108. EM EC techniques may include frequency-domain EC techniques and time-domain EC techniques. In time-domain and frequency-domain techniques, one or more transmitters 102 may be excited with an excitation signal and receiver 104 may record the reflected excitation signal for interpretation. The received signal is proportional to the amount of metal that is around transmitter 102 and receiver 104. For example, less signal magnitude is typically an indication of more metal, and more signal magnitude is an indication of less metal. This relationship may be utilized to determine metal loss, which may be due to an abnormality related to the pipe such as corrosion or buckling.

Figure 2:
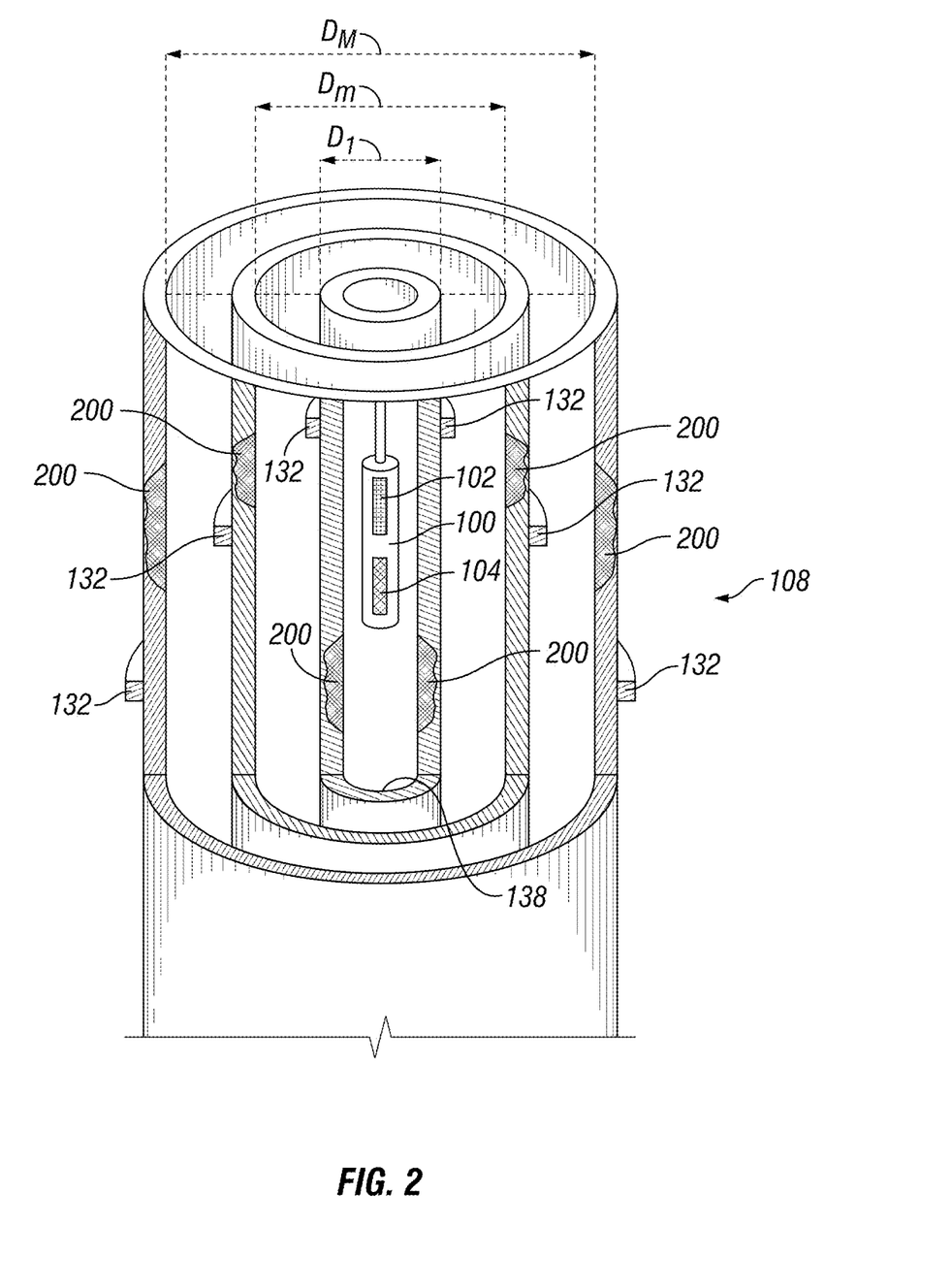
FIG. 2 illustrates an example of anomalies within multiple pipes.

FIG. 2 shows multi-channel induction tool 100 disposed in pipe string 138 which may be surrounded by a plurality of nested pipes (i.e. first casing 134 and second casing 136) and an illustration of anomalies 200 disposed within the plurality of nested pipes. As multi-channel induction tool 100 moves across pipe string 138 and casing string 108, one or more transmitters 102 may be excited, and a signal (mutual impedance between 102 transmitter and receiver 104) at one or more receivers 104, may be recorded.

Due to Eddy current physics and electromagnetic attenuation, pipe string 138 and/or casing string 108 may generate an electrical signal that is in the opposite polarity to the incident signal and results in a reduction in the received signal. Typically, more metal volume translates to more lost signal. As a result, by inspecting the signal gains, it is possible to identify zones with metal loss (such as corrosion). In order to distinguish signals that originate from anomalies at different pipes of a multiple nested pipe configuration, multiple transmitter-receiver spacing and frequencies may be utilized. For example, short spaced transmitters 102 and receivers 104 may be sensitive to first casing 134, while longer spaced transmitters 102 and receivers 104 may be sensitive to second casing 136 and/or deeper (3rd, 4th, etc.) pipes. By analyzing the signal levels at these different channels with inversion methods, it is possible to relate a certain received signal to a certain metal loss or gain at each pipe. In addition to loss of metal, other pipe properties such as magnetic permeability and conductivity may also be estimated by inversion methods. However, there may be factors that complicate interpretation of losses. For example, deep pipe signals may be significantly lower than other signals. Double dip indications appear for long spaced transmitters 102 and receivers 104. Spatial spread of long spaced transmitter-receiver signals for a collar 132 may be long (up to 6 feet (0.3048 meter)). Due to these complications, methods may need to be used to accurately inspect pipe features.

Figure 3:
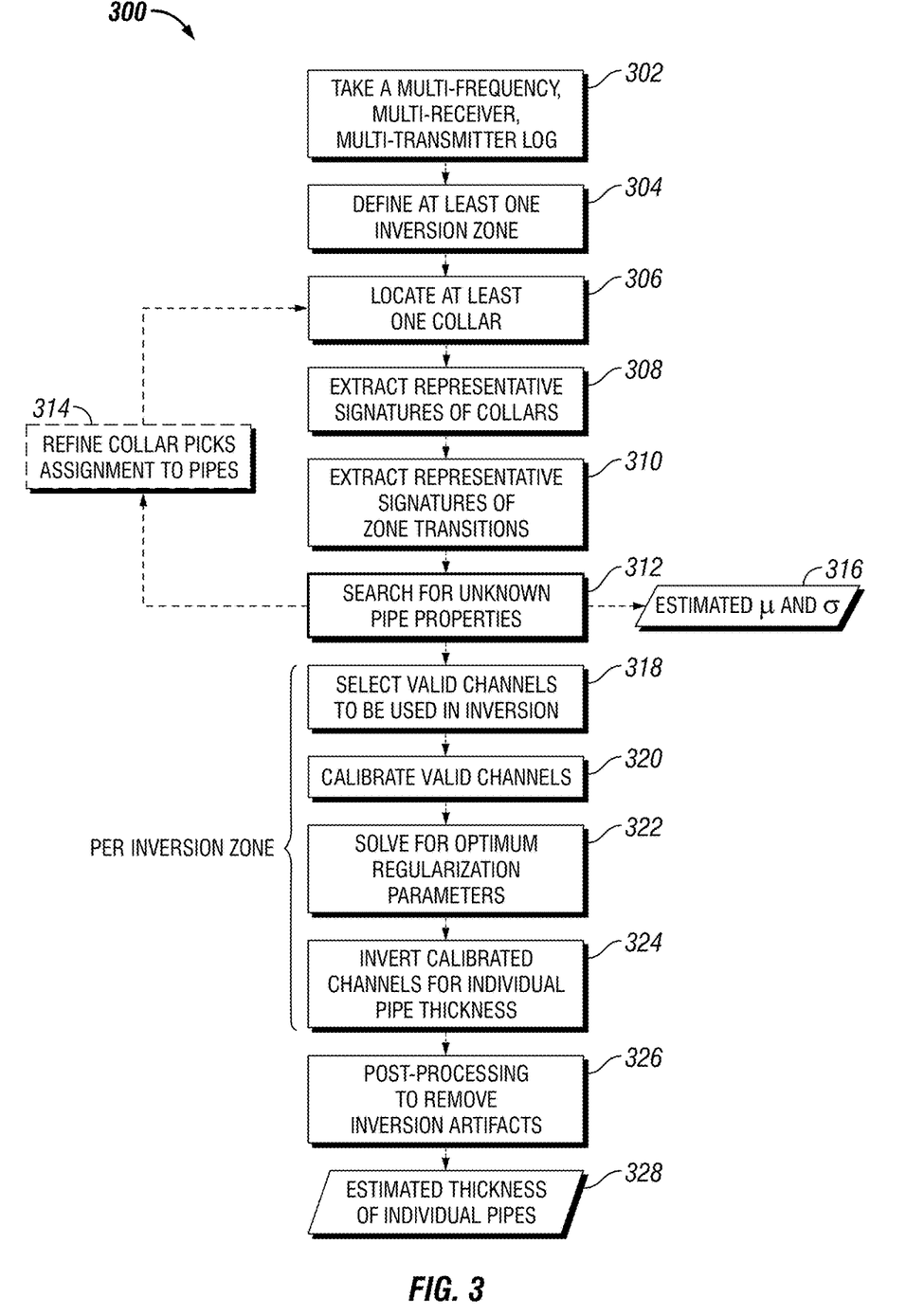
FIG. 3 illustrates a workflow for estimating material properties and individual thicknesses of a plurality of pipe in a well plan.

FIG. 3 illustrates workflow 300 for estimating material properties and individual thicknesses of pipe string 138, first casing 134, second casing 136, and/or a plurality of casings outside second casing 136 (e.g., referring to FIG. 1). Workflow 300 may be performed on an information handling system 144 (e.g., referring to FIG. 1). The method may begin with step 302 taking a multi-frequency, multi-receiver, multi-transmitter log, however, pre-recorded data from a previously taken log data may be utilized. In examples, multi-channel induction tool 100 may take measurements with at least one frequency, on at least one receiver 104, and with at least one transmitter 102 (e.g., referring to FIG. 1). In examples, there may be multiple frequencies and receivers 104 to be able to differentiate between corrosion on multiple casing strings 138. Multiple measurements may also be taken with different transmitters 102 at a given time.

Figure 4:
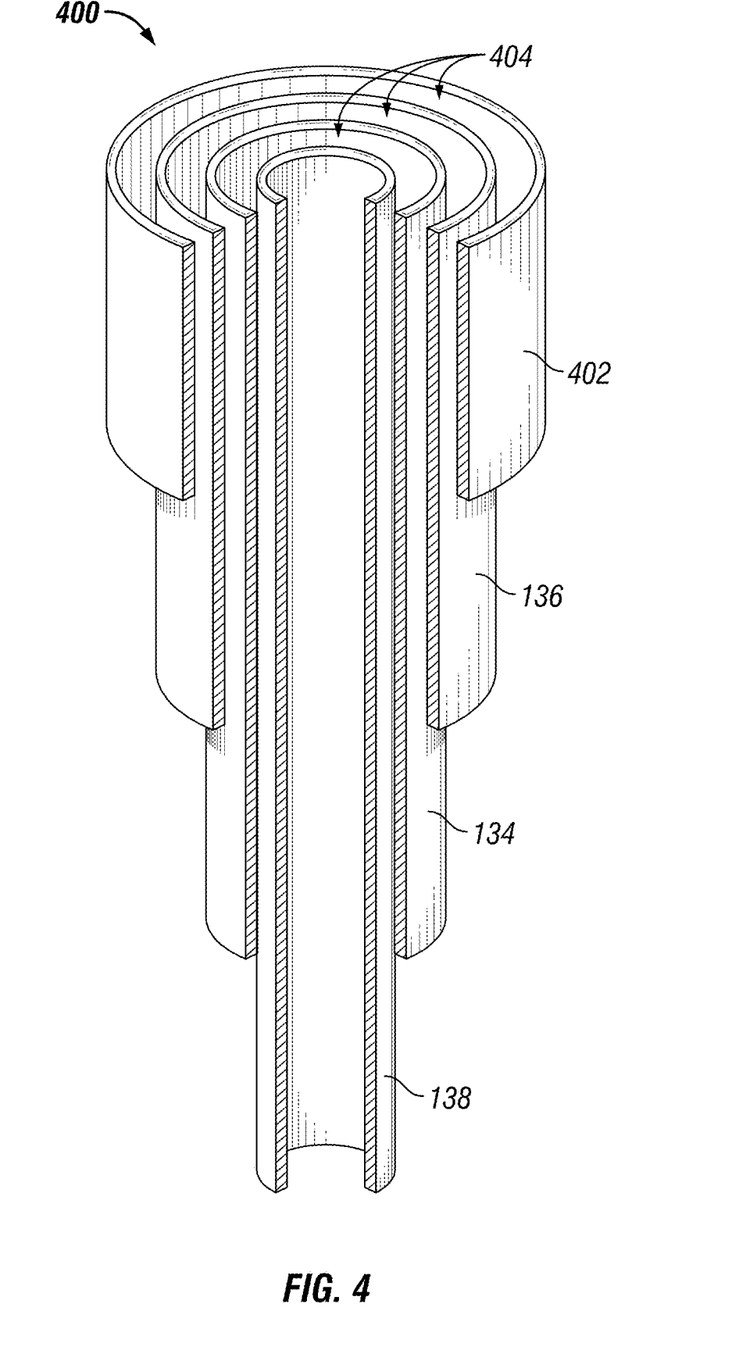
FIG. 4 illustrates an example of the well plan.

In step 304 an operator may define at least on inversion zone based on a pipe plan, wherein each inversion zone contains a fixed number of concentric pipes, and the inner/outer diameters of pipes may be invariant in the zone. At least one inversion zone may be defined in log data, each zone corresponding to a range in log data. In each of these ranges, the pipe configuration may be invariant (i.e., no change in the number of pipes, individual pipe weights, or individual inner diameters of the pipes). Determination of inversion zones may be based on the well plan. If the well plan is not be available, the inversion zones may be determined by visual inspection (i.e. based on visible shifts in the baseline of log data). FIG. 4 illustrates an example of a well plan 400. In this example, four inversion zones may cover the entire well plan 400. As illustrated in FIG. 4, well plan 400 may comprise pipe string 138, first casing 134, second casing 136, a conductor casing 402, and wherein cement may be disposed in annulus 404 between each casing.

Referring back to FIG. 3, step 306 may include locating at least one collar 132 (e.g., referring to FIG. 1) on at least one pipe string 138. Locating collars 132 on each one of pipe strings 138 may be performed manually by inspecting raw measurements. For example, short spaced transmitters 102 and receivers 104 may be sensitive to pipe string 138, while long spaced transmitters 102 and receivers 104 may be progressively sensitive to deeper pipes, such as first casing 134, second casing 136, and/or conductor casing 402 (e.g., referring to FIG. 4). Without limitation, locating collars 132 may be automated. Alternatively, locating collars 132 may also be done through independent measurements such as caliper or ultrasonic logs of individual pipes, if available.

Step 308 may include extracting at least one abnormality 200 (e.g., referring to FIG. 2) in log data that may correspond at a known metal thickness. Abnormality 200 may be a collar 132 disposed on at least one pipe in pipe string 138. In examples, thicknesses of collar 132 may be pre-known from available information on the type of collars 132 used on each pipe string 138, or assumed as some reasonable value (e.g., 0.2" (0.5 cm) for collars 132 on pipe string 138, and 0.1" (0.254 cm) for collars 132 on outer pipes, such as first casing 134, second casing 136, and/or conductor casing 402).

Figure 5:
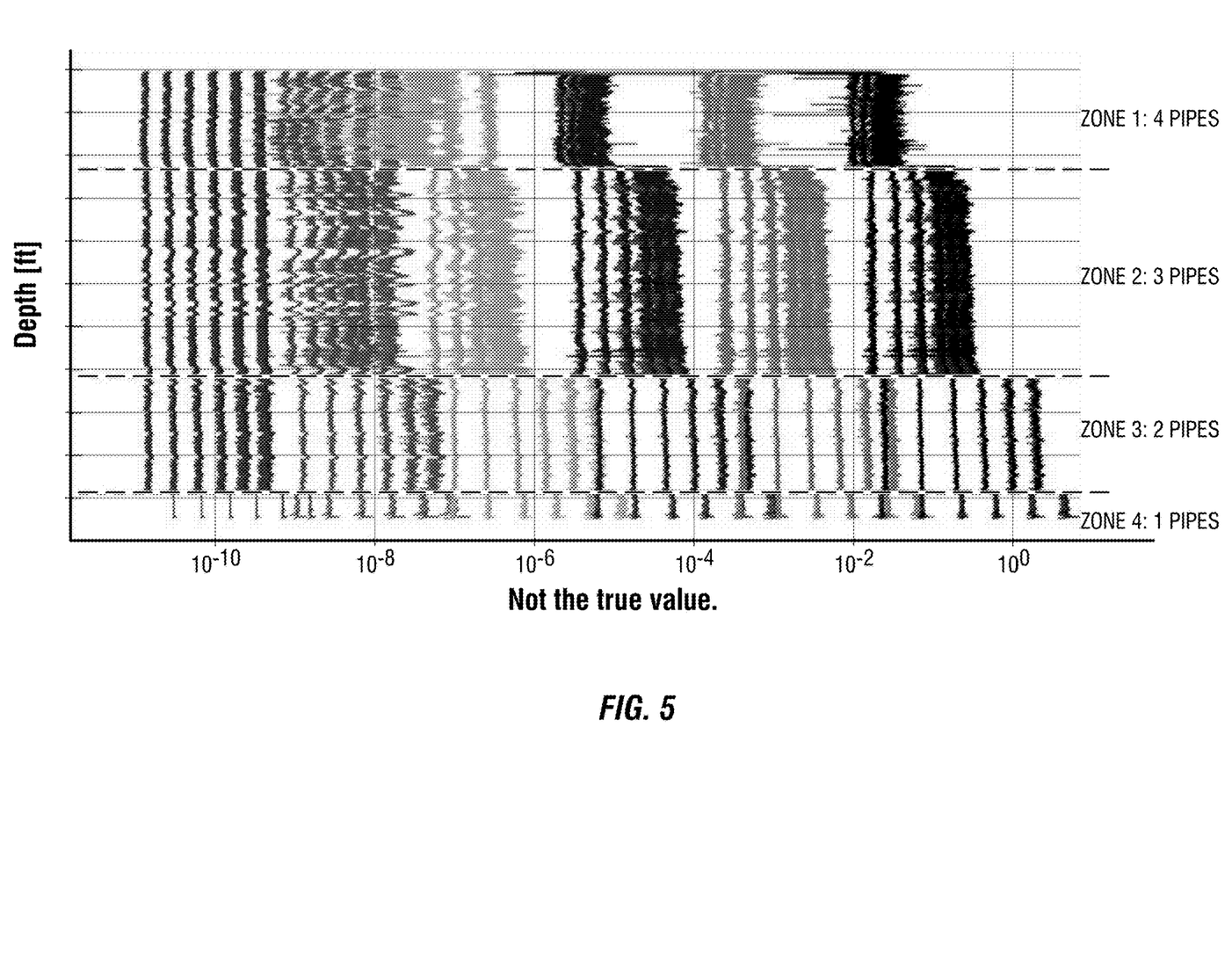
FIG. 5 illustrates nominal signal changes across zones.

In step 310 the operator may extract representative signatures of a zone transition. A zone transition may be a recording in log data where multi-channel induction tool 100 (e.g., referring to FIG. 1) may be passing through the end of a pipe in pipe string 138, the top of a pipe, from a heavier pipe to a lighter pipe, and/or vice versa. Zone transitions may occur when a casing string starts, ends, gets heavier, or lighter. These may be typically reflected as changes in nominal signal levels as illustrated in FIG. 5. A transition feature, which may indicate a zone transition, may be defined as the ratio, or difference, between the nominal signal levels of two distinct zones. Although the features may be classified as a 'transition' feature, the two zones may be adjacent.

From this information, in step 312, referring back to FIG. 3, the method may search for pipe material properties that may minimize the difference between responses extracted from log data and simulated responses. It should be noted that simulated responses may be a simulated feature, such as corrosion, reduction in material, increase in material, and/or the like that may be known to the operator. The material properties found may be looped into step 306 through step 314 to refine collar picks from pipe string 138. Additionally, in step 316 material properties may be utilized to estimate μ and σ. The features extracted from log data in the previous step may be used as input to an algorithm that estimates overall pipe material properties such as relative magnetic permeability (μ, or mu) and electric conductivity (σ, or sigma) of the pipes. The workflow of such a workflow 600 is shown in FIG. 6.

Figure 6:
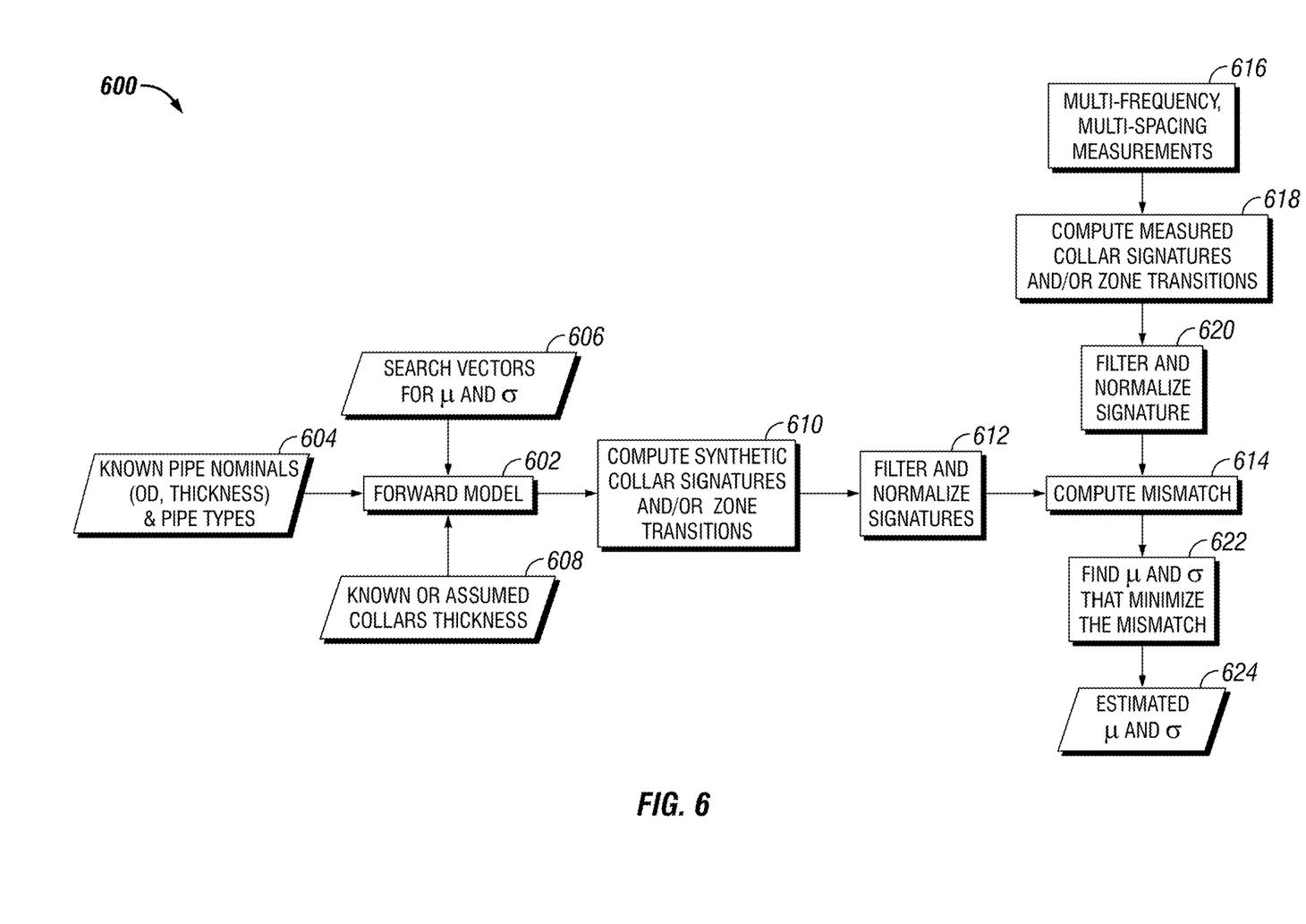
FIG. 6 illustrates a workflow of an estimation algorithm.

FIG. 6 illustrates a workflow 600, which may be a linear search over a given range of μ and/or σ values (also called a search vector), and chooses the optimum combination that minimizes the mismatch between the measured and synthetic features. Workflow 600 may begin with step 602, which may produce a forward model. Forward model may be formed from known pipe nominals (OD, thickness) & pipe types in step 604, search vectors for μ and σ in step 606, and/or known or assumed collar thickness in step 608. The forward model in step 602 may be processed by information handling system 144 (e.g., referring to FIG. 1) to compute synthetic collar signatures and/or zone transition in step 610. From the computations, information handling system 144 may filter and normalize signatures in step 612. To compute a mismatch in step 614, multi-frequency, multi-spacing measurements in step 616 may be taken. From measurements in step 616, information handling system 144 may compute measured collar signatures and/or zone transition in step 618. The measurements in step 618 may filter and normalize signatures in step 620. Thus, the forward model and actual measurements may be compared to compute a mismatch in step 614. A μ and σ may be found to minimize the mismatch in step 622, which may lead to a final estimated product of μ and σ in step 624.

The primary advantage of performing a linear search may be inherent parallelism. Each individual μ and σ combination may be tested on a different information handling system 144 (e.g., referring to FIG. 1), using well known parallelization frameworks such as MPI, OpenMP, Spark, Hadoop, and the like. The independence of each μ and/or σ test offers great flexibility in choosing the parallelization scheme. Certain schemes (such as Spark) do not work when communication across nodes is required, which may not be the case in the current workflow. For example, computing the mismatch in step 614 may be evaluated for each element in the μ, σ search vectors based on collar and zone transition responses as follows:

$$f(\mu_1, \ldots, \mu_N, \sigma_1, \ldots, \sigma_N) = \Sigma_m \Sigma_n \{\|W_{abs}^C(m,n) \times [V_{abs}^{mea}(m,n) - V_{abs}^{syn}(m,n)]\|_2^2 + \|W_{angle}^C(m,n) \times [V_{angle}^{mea}(m,n) - V_{angle}^{syn}(m,n)]\|_2^2\} + \Sigma_m \{\|W_{abs}^R(m) \times [R_{abs}^{mea}(m) - R_{abs}^{syn}(m)]\|_2^2 + \|W_{angle}^R(m) \times [R_{angle}^{mea}(m) - R_{angle}^{syn}(m)]\|_2^2\} \quad (6)$$

where η is defined as the index of the pipe number from 1 to N. N is the total number of pipes. Where $\mu_n$ is the permeability of pipe n and $\sigma_n$ is the conductivity of pipe n. Additionally, m is the index of measurements at different frequencies and receivers 104 from 1 to $N_{RX} \times N_{TX} \times N_f$ X $N_{Rx}$ is the number of receivers 104, $N_{Tx}$ is the number of transmitters 102, and $N_f$ is the number of frequencies. Additionally, variable listed below may be defined as:

$V_{abs}^{mea}$, $V_{angle}^{mea}$ is the amplitude/phase of the measured collar feature;

$V_{abs}^{syn}$, $V_{angle}^{syn}$ is the amplitude/phase of the synthetic collar feature;

$R_{abs}^{mea}$, $R_{angle}^{mea}$ is the amplitude/phase differences between average or nominal value of the measured transition features in current zone and another zone;

$R_{abs}^{syn}$, $R_{angle}^{syn}$ is the amplitude/phase differences between average or nominal value of the synthetic transition features in current zone and another zone;

$W_{abs}^C$, $W_{angle}^C$ is the weight on amplitude/phase differences between measured/synthetic collar features; and $W_{abs}^R$, $W_{angle}^R$ is the weight on amplitude/phase differences between measured/synthetic transition features.

It should be noted that amplitudes may be in linear or log scale. Additionally, collar features may be defined in terms of their relative deviation from the nominal (or baseline) signal level.

$$\left( e.g. \ V_{abs}^{mea} = \frac{(V_{abs_{collar}}^{mea} - V_{abs_{baseline}}^{mea})}{V_{abs\_baseline}^{mea}} \right).$$

Workflow 600 may also be used to refine the assignment of collars 132 (e.g., referring to FIG. 1) in step 306 for locating at least one collar 132, as illustrated in workflow 300. This may be needed in cases with multiple pipes (4 or more), where it may be difficult to make the right assignment of collar picks in outer pipes by manual inspection. Refining collars assignment may be done by running workflow 600 on different permutations of collar assignments, and picking the solution that minimizes the mismatch function for step 622.

Referring back to workflow 300 and FIG. 3, after implementing workflow 600, an inversion may be utilized to estimate the thickness of individual pipes on pipe string 138. Before inversion, pre-inversion techniques may be performed. For example in step 318, workflow 300 may select valid channels based on a well plan, signal quality, and conformity with a forward model (per zone). Each inversion zone may have bad and/or undesirable channels based on signal quality, well plan, or conformation with the forward model. For example, signal quality may review channels with low signal quality (e.g., low signal-to-noise ratio), which may be identified and marked as invalid. Additionally, selecting channels based on the signal quality may be done before running the estimation of the pipe material parameters. Comparing against a well plan, the number of receivers 104 or frequencies may be adjusted based on the number of pipes and the out diameter of the outermost pipe. When determining conformity with the forward model, some channels may not conform to the forward model that is used in the inversion. This may be due to some non-physical behavior of the channel, or could be due to an overly-simplified forward model that may not capture the physics of some channels. An operator may mark these channels as invalid.

In step 320, selected channels may be calibrated to minimize the difference between measured and simulated responses using known pipe nominals and pipe material properties. The measured log may be calibrated prior to running inversion to account for the deviations between measurement and simulation (forward model). The deviations may arise from several factors, including the nonlinear behavior of the magnetic core, magnetization of pipes, mandrel effect, and inaccurate well plans. Multiplicative coefficients and constant factors may be applied, either together or individually, to the measured log for this calibration. The calibrated measured logs may then be inserted into an inversion algorithm that may solve for a set of pipe parameters, including but not limited to, the individual thickness of each pipe, percentage of metal loss or gain, the individual $\mu$ and/or $\sigma$ of each pipe, the total thickness of each pipe, the eccentricity of each pipe, and/or the inner diameter of each pipe. This inversion algorithm may determine a set of pipe parameters by adjusting them until a cost function is minimized. The underlying optimization algorithm may be any one of the commonly-used algorithms, including but not limited to, the steepest descent, conjugate gradient, Gauss-Newton, Levenberg-Marquardt, and Nelder-Mead. Although the preceding examples may be conventional iterative algorithms, global approaches such as evolutionary and particle-swarm based algorithms may also be used. In examples, the cost function may be minimized using a linear search over a search vector rather than a sophisticated iterative or global optimization. The linear search, as mentioned earlier, has the advantage of being readily parallelizable, which may reduce computational loads on information handling system 144. An example of the inversion cost function that may use the calibrated measurements is given below:

$$F(x) = \frac{1}{2M}\left\|W_{m,abs}X\left(\frac{|\hat{m}|-|s(x)|}{|s(x)|}\right)\right\|_2^2 + \quad (7)$$

$$\frac{1}{2M}\left\|W_{m,angle}X \text{ angle}\left\{\frac{\hat{m}}{s(x)}\right\}\right\|_2^2 + |W_x X(x-x_{nom})|_1$$

where $\hat{m}$ is a vector of M complex-valued calibrated measurements such that $\hat{m}_{nom} = s_{nom}$.

The cost function above contains three terms: the magnitude misfit, the phase misfit, and the regularization that is used to eliminate spurious non-physical solutions of the inversion problem. Alternatively, real and imaginary parts of the measurement and phase may also be used in the cost function. Many other norms (other than the 2-norm and 1-norm above) may also be used. In examples, calibration becomes unnecessary by using a self-calibrated inversion cost function given below:

$$F(x) = \frac{1}{2M}\left\|W_{m,abs}X\left(\frac{|\hat{m}|-|s(x)|}{|s(x)|}\right)\right\|_2^2 + \quad (8)$$

-continued $$\frac{1}{2M}\left\|W_{m,angle}X\left(\text{angle}\left\{\frac{m}{m_{nom}}\right\} - \text{angle}\left\{\frac{s(x)}{s}\right\}\right)\right\|_2^2 +$$

$$|W_x X(x-x_{nom})|_1$$

where x is the vector of N unknowns (model parameters), $x=[t_1, \ldots, t_p, \mu_1, \ldots, \mu_p, \sigma_1, \ldots, \sigma_p, \ldots]$, $N_p$ is the number of pipes, and m=vector of M complex-valued measurements at different frequencies and receivers 104 (e.g., referring to FIG. 1). Additionally, $m_{nom}$ is the vector of M complex-valued nominal measurements. These may be computed as the signal levels of highest provability of occurrence within a given zone. Further, s(x) is the vector of M forward model responses, $s_{nom}$ is the vector of M complex-valued forward model responses corresponding to the nominal properties of the pipes, $W_{m,abs}$, $W_{m,angle}$ are the measurement magnitude and phase weight matrices. M×M is a diagonal matrices used to assign different weights to different measurements based on the relative quality or importance of each measurement. Additionally, $W_x$ is N×N diagonal matrix of regularization weights and $x_{nom}$ is the vector of nominal model parameters. For N-dimensional vector y, $\|y\|_2 = \Sigma_{i=1}|y_i|$ and $\|y\|_1 = \Sigma_{i=1}|y_i|$. It should also be noted that the division s(x)/s is element-wise division. The type of cost function in Equation (8) is independent of the calibration as long as it is multiplicative. Therefore, the calibration step may become unnecessary if Equation (8) is used as the cost function in inversion.

From the calibrations, the calibrations may be utilized for solving for optimum regularization parameters for use in inversion in step 322, referring to workflow 300 in FIG. 3. As mentioned above, the last term in Equation (7) or Equation (8) is called the regularization term, and the weights $W_x$ are called regularization parameters. Regularization is a common optimization technique for dealing with ill-posedness (or extreme sensitivity to errors in measurement) which are often encountered in practical applications. The choice of the optimum regularization weights (parameters), which determines the weight of the regularization term in the cost function with respect to the misfit term, may be automated. In essence, the optimum regularization weights are chosen by the minimization of the negative correlation (or mirroring) between curves of various pipe thicknesses. Mirroring usually points to ill-posedness in the problem, which is remediated by regularization. The optimum regularization parameter is the one that minimizes the mirroring between thickness curves.

To finalize pre-inversion techniques in step 324 calibrated measurements are inverted for a set of pipe properties at each depth point. After inversion in step 324, in step 326 post-processing may be utilized to invert log data to remove artifacts due to inversion model limitation. Output logs (i.e. those for the set of pipe parameters estimated by the inversion algorithm) may be post-processed to remove artifacts such as ghost collars (shadow copies of a collar on pipes at the same depth), double peaks (due to finite spacing between transmitter–receiver), and/or eccentricity effects (false metal gain on one or more pipes associated with eccentricity over a multi joint range). It should be noted that logs may be a digital or hard copy that may present thickness, defects, and/or any other pipe properties as a function of depth from the surface.

The removal of ghosts and double peaks may be readily automated since locations of collars 132 (Referring to FIG. 1) may be known. The eccentricity effect removal may be automated by searching for false metal gains on multiple pipes over a multi joint range. The artifacts may be removed using various interpolation techniques (e.g. linear, polynomial, spline), or by subtraction of a certain polynomial. In another embodiment, the above operations may be applied before calibration and inversion as pre-processing steps. Resolution enhancement techniques such as deconvolution could also be applied either in per- or post-processing to mitigate ghosting and double peak issues. In step 328 the final product may be a thickness estimation of individual pipes. As discussed above, improvements to current technology are that an inversion based on the forward model disclosed in this invention will ensure accurate estimation of features with large swings from nominals such as collars and deep defects. Additionally, the forward model disclosed above may ensure that all non-noisy channels are incorporated in the inversion without having the channels exhibiting high non-linearity which breaks a linearized model assumption. Additionally, the method for building the pre-computed table disclosed above provides an error control by increasing the number of sampling points in steps and checking for the error between the full-model and the interpolation-based (fast) model after each step. Thus, the fast forward model disclosed is more accurate than the linearized model and faster to compute than a full model. It will improve performance by removing the need to investigate channels to discard those that break the linearized model.

By determining relative magnetic permeability ($\mu$, or mu) and electric conductivity ($\sigma$, or sigma) of the pipes, an operator may be able to determine the exact location within a pipe string, or casing, where a well operation may be performed in response to the identified feature, such as corrosion. In examples, any suitable well operation may be performed to address the corrosion in Response to the identified feature, including, but not limited to, chemical treatments, among others. Well operations may involve replacing, fixing, or adding casing string, tubing, collars, filters, packers, and/or the like. In examples, an operator may spot treat corrosion by removing the corrosion and adding protective coatings to the affected area. This may prevent the loss of production fluids, chemicals, and/or the like into the formation.

The preceding description provides various examples of the systems and methods of use disclosed herein which may contain different method steps and alternative combinations of components.

Statement 1. A method for determining properties of a pipe string using multi-channel induction measurements may comprise disposing a multi-channel induction tool in a cased hole, obtaining a multi-channel measurement, forming a log from the multi-channel measurement, extracting at least one abnormality that corresponds to known metal thickness, performing a search to find a set of pipe material properties that minimize a mismatch between the abnormality and a simulated response, and inverting the log to estimate the set of pipe material properties at one or more depth points using the set of pipe material properties.

Statement 2. The method of statement 1, wherein the multi-channel measurement comprises multi-frequencies and multi-spacing measurements recorded using a frequency-domain eddy current technique.

Statement 3. The method of statements 1 or 2, wherein the multi-channel measurement comprises measurements at a receiver with different sizes and at different time delays using a time-domain eddy current technique.

Statement 4. The method of statements 1 to 3, wherein the multi-channel measurement is performed with a plurality of transmitters active at different times.

Statement 5. The method of statements 1 to 4, wherein the set of pipe material properties include a magnetic permeability and an electrical conductivity of each pipe, or an averaged value for all pipes.

Statement 6. The method of statements 1 to 5, wherein the abnormality corresponds to known metal thickness is a collar on at least one of the pipes and the at least one of the pipes is part of the pipe material properties.

Statement 7. The method of statements 1 to 6, where the set of pipe material properties are inverted in at least two inversion zones, wherein a plurality of pipes, an individual weights of the plurality of pipes, an individual inner diameters of the plurality of pipes are invariant in each inversion zone, and, wherein the abnormality corresponds to known metal thickness as a transition between two inversion zones.

Statement 8. The method of statements 1 to 7, wherein inverting the log to estimate the set of pipe material properties is parallelized on multiple processors.

Statement 9. The method of statements 1 to 8, wherein the set of pipe material properties includes an individual thickness of each pipe, a percentage metal loss or gain of each pipe, an individual magnetic permeability of each pipe, an individual electrical conductivity of each pipe, a total thickness of each pipe, an eccentricity of each pipe, or an inner diameter of each pipe.

Statement 10. The method of statements 1 to 9, wherein the multi-channel measurement is calibrated prior to running an inversion to a difference between measured and simulated responses using known pipe nominals and pipe material properties.

Statement 11. The method of statements 1 to 10, wherein the inversion employs a self-calibrating cost function, making it unnecessary to calibrate the log.

Statement 12. The method of statements 1 to 11, wherein the set of pipe material properties includes collar features and wherein the collar features are the relative deviation of the signal from a nominal signal.

Statement 13. The method of statements 1 to 12, wherein the inverting the set of pipe material properties is performed using a linear search over a search set and wherein the linear search for the set of pipe material properties is parallelized on multiple processors.

Statement 14. The method of statements 1 to 13, wherein a valid subset of multi-channel measurements are chosen for the inversion of the set of pipe material properties, using an automatic algorithm based on a well plan, a signal quality, and a conformity with a forward model.

Statement 15. The method of statements 1 to 14, wherein the inverting the log to estimate the set of pipe material properties further comprises employing a cost function that includes a regularization term.

Statement 16. The method of statements 1 to 15, further comprising choosing an optimum regularization term by minimizing a correlation between thickness curves.

Statement 17. The method of statements 1 to 16, further comprising removing an inversion artifact is by an automated algorithm using collar locations found previously, wherein the inversion artifact is a ghost collar, a double peak, or an eccentricity effect, and optionally, removing the inversion artifact in post-processing or pre-processing.

Statement 18. A system for detecting an abnormality in a plurality of pipes may comprise a multi-channel induction tool. The multi-channel induction tool may comprise at least one transmitter, wherein the transmitter is configured to emit an electromagnetic field, and at least one receiver, wherein the receiver is configured to record a secondary electromagnetic field. The system may further comprise an information handling system configured to form a log of a multi-channel measurement from the at least one receiver, identify at least one abnormality that corresponds to known metal thickness, perform a search to find a set of pipe material properties that minimize a mismatch between the abnormality and a simulated response, and invert the log to estimate the set of pipe material properties at one or more depth points using the set of pipe material properties.

Statement 19. The system of statement 18, wherein the set of pipe material properties includes an individual thickness of each pipe, a percentage metal loss or gain of each pipe, an individual magnetic permeability of each pipe, an individual electrical conductivity of each pipe, a total thickness of each pipe, an eccentricity of each pipe, or an inner diameter of each pipe Statement 20. The system of statements 18 or 19, wherein the information handling system is further configured to remove an inversion artifact by an automated algorithm using collar locations found previously, wherein the inversion artifact is a ghost collar, a double peak, or an eccentricity effect.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for determining properties of a pipe string using multi-channel induction measurements, comprising:
    disposing a multi-channel induction tool in a cased hole;
    obtaining a multi-channel measurement;
    forming a log from the multi-channel measurement;
    extracting at least one abnormality from the log, wherein the at least one abnormality is a collar;
    performing a search to find a set of pipe material properties that minimize a mismatch between the abnormality and a simulated response; and
    inverting the log to estimate the set of pipe material properties at one or more depth points using the set of pipe material properties.

2. The method of claim 1, wherein the multi-channel measurement comprises multi-frequencies and multi-spacing measurements recorded using a frequency-domain eddy current technique.

3. The method of claim 1, wherein the multi-channel measurement comprises measurements at a receiver with different sizes and at different time delays using a time-domain eddy current technique.

4. The method of claim 1, wherein the multi-channel measurement is performed with a plurality of transmitters active at different times.

5. The method of claim 1, wherein the set of pipe material properties include a magnetic permeability and an electrical conductivity of each pipe, or an averaged value for all pipes.

6. The method of claim 1, wherein where the set of pipe material properties are inverted in at least two inversion zones, wherein a plurality of pipes, an individual weights of the plurality of pipes, an individual inner diameter of the plurality of pipes are invariant in each inversion zone, and, wherein the abnormality corresponds to known metal thickness as a transition between two inversion zones.

7. The method of claim 1, wherein inverting the log to estimate the set of pipe material properties is parallelized on multiple processors.

8. The method of claim 1, wherein the set of pipe material properties includes an individual thickness of each pipe, a percentage metal loss or gain of each pipe, an individual magnetic permeability of each pipe, an individual electrical conductivity of each pipe, a total thickness of each pipe, an eccentricity of each pipe, or an inner diameter of each pipe.

9. The method of claim 1, wherein the multi-channel measurement is calibrated prior to running an inversion to a difference between measured and simulated responses using known pipe nominals and pipe material properties.

10. The method of claim 1, wherein the inversion employs a self-calibrating cost function, making it unnecessary to calibrate the log.

11. The method of claim 1, wherein the set of pipe material properties includes collar features and wherein the collar features are the relative deviation of the signal from a nominal signal.

12. The method of claim 1, wherein the inverting the set of pipe material properties is performed using a linear search over a search set and wherein the linear search for the set of pipe material properties is parallelized on multiple processors.

13. The method of claim 1, wherein a valid subset of multi-channel measurements are chosen for the inversion of the set of pipe material properties, using an automatic algorithm based on a well plan, a signal quality, and a conformity with a forward model.

14. The method of claim 1, wherein the inverting the log to estimate the set of pipe material properties further comprises employing a cost function that includes a regularization term.

15. The method of claim 1, further comprising choosing an optimum regularization term by minimizing a correlation between thickness curves.

16. The method of claim 1, further comprising removing an inversion artifact is by an automated algorithm using collar locations found previously, wherein the inversion artifact is a ghost collar, a double peak, or an eccentricity effect, and optionally, removing the inversion artifact in post-processing or pre-processing.

17. A system for detecting an abnormality in a plurality of pipes comprising:
a multi-channel induction tool comprising:
at least one transmitter, wherein the transmitter is configured to emit an electromagnetic field; and
at least one receiver, wherein the receiver is configured to record a secondary electromagnetic field; and
an information handling system configured to:
form a log of a multi-channel measurement from the at least one receiver;
identify at least one abnormality that corresponds to known metal thickness;
extract at least one abnormality from the log wherein the at least one abnormality is a collar;
perform a search to find a set of pipe material properties that minimize a mismatch between the abnormality and a simulated response; and
invert the log to estimate the set of pipe material properties at one or more depth points using the set of pipe material properties.

18. The system of claim 17, wherein the set of pipe material properties includes an individual thickness of each pipe, a percentage metal loss or gain of each pipe, an individual magnetic permeability of each pipe, an individual electrical conductivity of each pipe, a total thickness of each pipe, an eccentricity of each pipe, or an inner diameter of each pipe.

19. The system of claim 17, wherein the information handling system is further configured to remove an inversion artifact by an automated algorithm using collar locations found previously, wherein the inversion artifact is a ghost collar, a double peak, or an eccentricity effect.

20. The system of claim 17, wherein the log of the multi-channel measurement comprises multi-frequencies and multi-spacing measurements recorded using a frequency-domain eddy current technique.

\* \* \* \* \*